Nov. 2, 1965 K. BOUSCHART ETAL 3,214,967
APPARATUS FOR TESTING MEAT AND THE LIKE
Filed June 7, 1962 4 Sheets-Sheet 1

KENNETH BOUSCHART
EARL A. MEYER
INVENTORS

BY
RICHARDS & CIFELLI
ATTORNEYS

KENNETH BOUSCHART
EARL A. MEYER
INVENTORS

BY
RICHARDS & CIFELLI
ATTORNEYS

Nov. 2, 1965    K. BOUSCHART ETAL    3,214,967
APPARATUS FOR TESTING MEAT AND THE LIKE
Filed June 7, 1962    4 Sheets-Sheet 3

KENNETH BOUSCHART
EARL A. MEYER
INVENTORS

BY
RICHARDS & CIFELLI
ATTORNEYS

KENNETH BOUSCHART
EARL A. MEYER
INVENTORS

BY

RICHARDS & CIFELLI
ATTORNEYS

United States Patent Office 3,214,967
Patented Nov. 2, 1965

3,214,967
APPARATUS FOR TESTING MEAT AND THE LIKE
Kenneth Bouschart and Earl A. Meyer, Madison, Wis., assignors to Feed Service Corporation, Crete, Nebr., a corporation of Nebraska
Filed June 7, 1962, Ser. No. 200,788
15 Claims. (Cl. 73—81)

This invention relates to apparatus for testing meat, or the like, and more particularly to electro-mechanical apparatus for providing a direct indication of the relative tenderness of meat in a consistent, accurate manner.

Reference is made to co-pending United States application, Serial No. 171,713, now abandoned, filed February 7, 1962, and entitled, "Rotating Knife Tenderometer." Such application discloses a method and apparatus for the testing of meat, or the like, to determine the tenderness thereof. A plurality of successive passes of a rotating, relatively dull cutting blade are made through the meat under test. The blade is spring biased to maintain a substantially constant blade-to-meat pressure whereby the depth of blade penetration into the meat, for a predetermined number of blade revolutions, varies with the tenderness of the meat. A recording mechanism, coupled to the rotating blade, provides a visual record of the depth of blade penetration, which record is indicative of the relative tenderness of the particular meat sample.

The invention to be described hereinbelow utilizes a similar penetrating blade arrangement, but in place of, or in addition to, the recording mechanism there are provided suitable means and associated circuitry whereby the apparatus provides a direct indication of meat tenderness on a suitable read-out means.

An object of this invention is the provision of apparatus for testing meat and providing a direct indication of relative tenderness.

An object of this invention is the provision of meat testing apparatus wherein a cutting blade is caused to penetrate into the meat at a constant pressure and angular velocity and the extent of blade penetration into the meat, over a given time period, is converted into electrical variations for measurement purposes.

An object of this invention is the provision of meat testing apparatus comprising means cutting into the meat under predetermined conditions, transducer means providing an electrical potential having a magnitude which varies with the depth of the cut made in the meat and read-out means energized by the potential and calibrated in factors indicative of the relative tenderness of the meat.

An object of this invention is the provision of meat testing apparatus comprising a rotating cutting blade adapted to penetrate into the meat at a constant pressure, means providing an electrical potential in correspondence with the depth of blade penetration into the meat, means integrating the electrical potential throughout selected cycles of blade rotation, and read-out means responsive to the integrated electrical potential and calibrated in factors of meat tenderness.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

Figure 1:
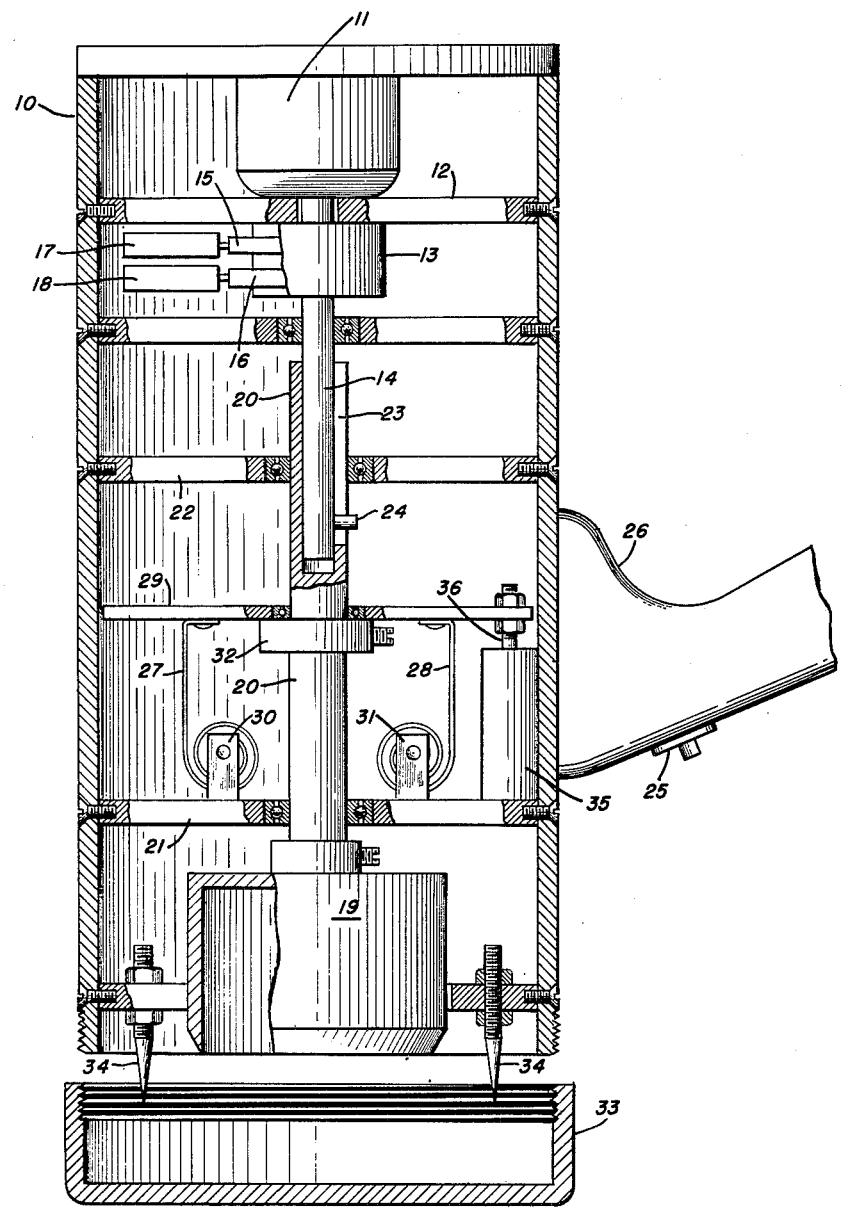
FIGURE 1 is, essentially, a central cross sectional view of the cutting head of apparatus made in accordance with this invention.

Reference, now, is made to FIGURE 1, wherein there is shown a cylindrical housing 10 enclosing a synchronous motor 11, secured in fixed position as by the mounting plate 12, and having a shaft coupled to a suitable gear reduction unit 13. The purpose of the gear reduction unit is to provide a predetermined, relatively low speed, rotation of the main drive shaft 14 and a predetermined rotation of the cams 15 and 16, which cams effect proper operation of the associated electrical switches 17 and 18, respectively. A cylindrical cutting blade 19 is centrally secured to the axial shaft 20 which is rotatable in bearings carried by the fixed plates 21 and 22 and is provided with an axial bore, at the upper end, for receiving the main drive shaft 14. Also formed in the upper end of the shaft 20 is a longitudinal slot 23 which provides a close-fitting channel for a pin 24 secured to the drive shaft 14. It will be apparent that when the motor is energized, rotation of the drive shaft 14 is imparted to the shaft 20, while, at the same time, permitting relative axial movement of these two shafts. Energization of the motor is effected by closure of a switch 25 carried by the handle 26.

A constant force is applied along the blade axis and, in a forward direction (downwardly, as viewed in the drawings) by means of coiled springs 27 and 28, said springs each having one end secured to the pressure plate 29 and the other end secured to pins carried by the associated brackets 30, 31, which brackets are suitably secured in fixed position on the fixed plate 21. It will be noted that the pressure plate 29 is provided with a central clearance hole for the shaft 20 and abuts against a collar 32 that is secured to the shaft by a set screw. Normally, then, the downward pressure exerted by the springs 27 and 28 on the axially-slidable shaft 20 will result in protrusion of the edge of the cutting blade beyond the end of the casing 10. Consequently, when the device is not in use, a protective cap 33 is threadedly secured to the casing. Although only two, biasing springs 27, 28 are shown in the drawing, it is preferable to use three or four such springs to distribute the spring load more uniformly about the shaft axis and thereby obtain a smooth sliding movement of the shaft during cutter rotation as well as a lower spring rate per spring.

During actual use of the device, the end of the cutting blade is brought into contact with the surface of the meat to be tested and a sufficient pressure applied to the housing to also bring the housing end into contact with the meat surface. Depression of the switch 25 closes the electrical circuit to the synchronous motor resulting in rotation of the cutting blade at a predetermined constant speed. The blade, therefore, cuts into the meat to a depth depending upon the number of cutting revolutions of the blade and the tenderness of the meat. A plurality of spikes 34 are adapted to penetrate into the meat sample under test thereby to stabilize the apparatus during use and to promote a clean cutting action of the blade.

A transducer 35, in the form of a rectilinear potentiometer, functions to produce electrical voltage variations in correspondence with the depth of penetration of the cutting blade into the meat. The body portion of the potentiometer is secured in fixed position relative to the casing 10 and has an axially-displaceable movable, or wiper, arm affixed to the rod 36, which rod is secured to the pressure plate 29 and, therefore, simultaneously movable therewith. It may here be pointed out that the output voltage of the potentiometer is directly proportional to axial displacement of the cutting blade whereby in actual use of the apparatus such output voltage varies linearly with the penetration of the blade into the meat.

Figure 2:
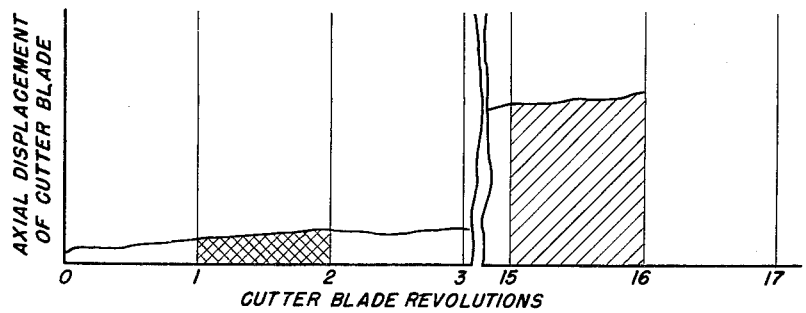
FIGURE 2 is a graph showing the axial displacement of the cutter blade in terms of blade revolutions.

Reference now is made to FIGURE 2, which is a graph showing the axial displacement of the cutting blade per blade revolution. The slight displacement at the start of the test corresponds with the initial set of the spring-biased cutter blade into the meat. Now, as the blade rotates at a constant speed and at a constant blade-to-meat pressure, the trace represented by the curve represents the downward axial blade displacement and the integrated area under the curve corresponds to the relative tenderness of the meat. Obviously, the more tender the meat, the greater will be the rate of blade penetration and the sharper will be the slope of the curve. In actual practice, the first cycle of blade rotation is utilized to properly condition the functional operation of the apparatus for proper repetitive tests. Also, the surface of the meat may not be precisely monoplanar and generally has a characteristic, for one reason or another, which differs from that of the underlying body of the meat. Therefore, we do not utilize the first revolution of the cutter for test and measurement purposes. Further, we have found that sixteen revolutions of the cutter result in a sufficient penetration of the meat sample to provide a reliable test result. Under these conditions, the shaded area under the curve represents the blade penetration integrated throughout the sixteenth revolution of the blade and the cross-hatched area represents the blade penetration integrated throughout the second revolution of the blade. Subtracting the latter area from the former provides a factor which can be taken as directly related to the tenderness of the meat.

The apparatus disclosed in the above-referenced copending application includes a recording mechanism which provides a curve such as that described with reference to FIGURE 2. The two critical areas are measured, as by a planimeter, to obtain the tenderness of the meat tested. Such measurement of the areas is time consuming and it is desirable to provide apparatus for the direct indication of tenderness. The present invention is directed to the provision of such apparatus.

Figure 3:
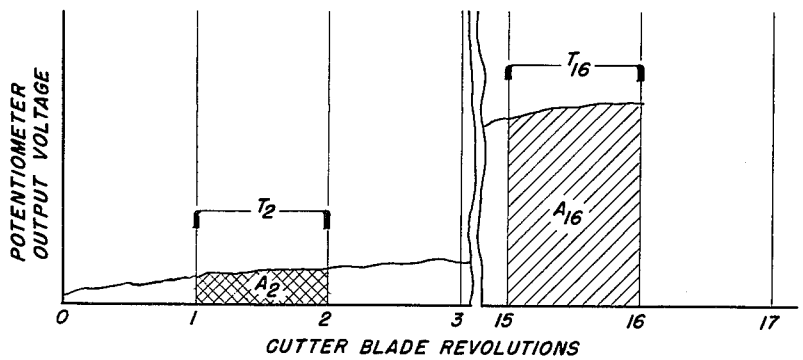
FIGURE 3 is a similar curve showing the output voltage variation of the potentiometer having a movable contact displaceable in correspondence with axial displacement of the cutter blade.

As described hereinabove, the operating head of the apparatus includes a potentiometer which provides a voltage output directly proportional to the depth of penetration of the cutter blade into the meat, the input terminals of the potentiometer being connected across a constant voltage. FIGURE 3 is a curve showing the voltage output of the potentiometer as the cutter blade penetrates into the meat. By means of suitable switching, to be described below, the integrated voltage for the second revolution of the cutter blade is subtracted from the integrated voltage for the sixteenth revolution of the blade, thereby providing a resultant voltage which actuates a suitable read-out device calibrated in terms of tenderness. Electrical integration is accomplished by resistance-capacitance means wherein the voltage to be integrated charges a known capacitor through a known resistor. If the circuit time constant is large compared to the integration time, the voltage across the capacitor will be very nearly proportional to the product of the applied voltage and the length of time it is applied to the capacitor. This product represents the area under the voltage-time curve, as, for example, the areas $A_2$ and $A_{16}$ shown in FIGURE 3. This is so even when the voltage to be integrated varies with time since the instantaneous charge contribution to the capacitor will change by a proportional amount.

Figure 4:
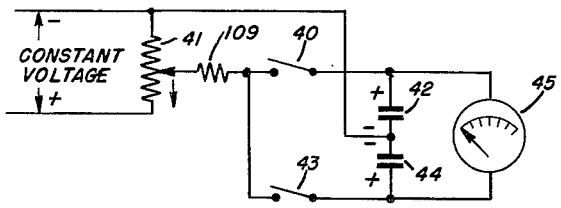
FIGURE 4 is a schematic diagram of the basic electrical integrator circuit.

The basic integrator circuit is shown in FIGURE 4. The switch 43 is closed during the first reference integration period (during the second cutter revolution) thereby applying the output voltage of the potentiometer 41 across resistor 109 and capacitor 44, the time integral of the voltage across the capacitor 44 corresponding to the area $A_2$ in FIGURE 3. The switch 40 is closed during the second integration period (sixteenth cutter revolution) thereby applying the potentiometer output voltage across resistor 109 and capacitor 42, the time integral of the voltage across the capacitor 42 corresponding to the area $A_{16}$ in FIGURE 3. Since the voltages on these identical capacitors are in series opposition, the meter 45 will respond to the voltage difference, which difference is proportional to the area $(A_{16}-A_2)$, as required. It may here be pointed out that the electrical integration is made with respect to time and, therefore, the switches 40 and 43 are closed for a fixed time duration rather than for a fixed angular displacement of the cutter blade. These time intervals, $T_2$ and $T_{16}$, in FIGURE 3, are controlled by a timer switch having a high repeatable accuracy.

Figure 7:
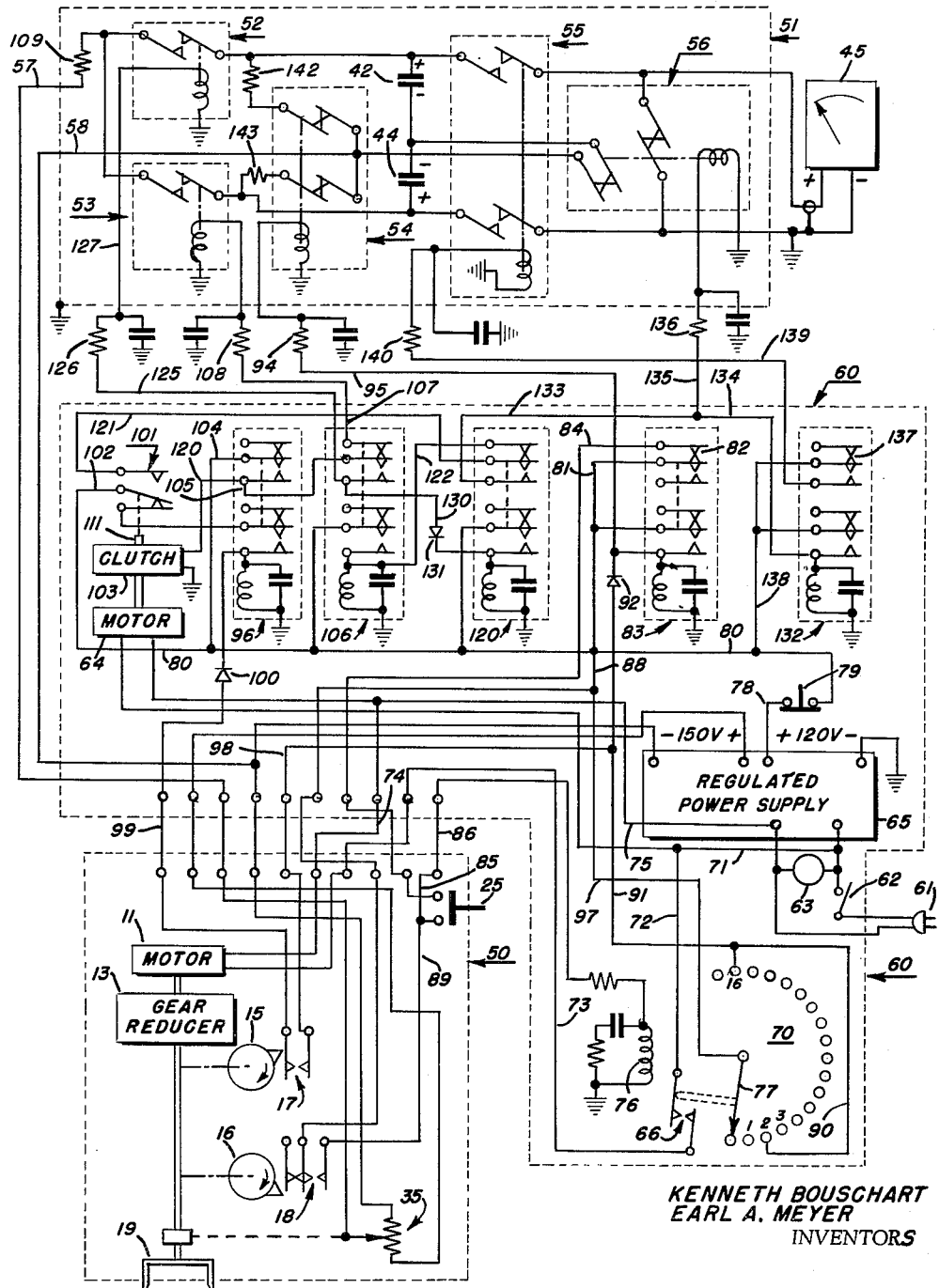
FIGURE 7 is a schematic circuit diagram of the apparatus.

Reference is now made to the schematic circuit diagram of FIGURE 7. Before proceeding with a detailed description of the circuit operation, it appears advisable to call attention to certain combinations which go to make up the complete apparatus. The dotted outline 50 encloses the operating head of the apparatus which includes the cutter drive motor 11, gear reduction unit 13, and the drive shaft to which the cutter blade 19 is secured. Also included in the head are the cams 15 and 16, which operate the associated switches 17 and 18, respectively, and the starting switch 25. The parts here referred to carry the same reference numerals as in FIGURE 1 for easy reference. When the motor is energized, the cams 15 and 16 rotate in synchronization with the cutter, at a speed of about 4 seconds per revolution. The movable arm of the potentiometer 35 is displaced downwardly in correspondence with the downward axial displacement of the cutter, as the latter spirals into the meat. Thus, with a constant voltage applied to the potentiometer input terminals, the potentiometer output voltage will vary directly with the depth of penetration of the cutter into the meat.

The dotted outline 51 represents a sealed can which encloses the electrical integrating circuit and is provided with metal to glass connecting pins for establishing electrical connection to the encased circuit. The internal connection wires are provided with high quality insulation, such as Teflon, and care is exercised to prevent electrical leakage and to maintain a constant interelement capacity. As a further precaution against electrical leakage, a container of desiccant is included within the sealed can to absorb any entrapped moisture. Included within the can are the two identical capacitors 42, 44, various resistors and the relays 52–56 which control the charge and discharge circuits of the capacitors. During the second revolution of the cutter blade the capacitor 44 is charged by the output voltage of the potentiometer which appears across the leads 57 and 58. During the sixteenth revolution of the cutter blade, the capacitor 42 is charged by the potentiometer output voltage of the same polarity with respect to ground as the capacitor 44. At the conclusion of the sixteenth revolution of the cutter blade, the electrometer 45 is connected across the two capacitors in series opposition, the voltage difference providing a direct indication of the tenderness of the meat sample tested. The electrometer is of conventional design, the characteristic feature of which is a high input impedance which does not appreciably discharge the capacitors during the voltage measurement period, that is, the capacitor voltage difference will remain displayed for an appreciable time period. In consequence, ample time is afforded for a reading of the electrometer pointer relative to an associated scale calibrated in factors of meat tenderness.

The control circuit of the apparatus is shown disclosed within the dotted outline 60. The lead connections between the control circuit and the integrating circuit are permanent whereas the connections between the control circuit and the operating head 50 of the apparatus preferably are in the form of a flexible plug-in type cable.

Power for the apparatus is obtained by inserting the plug connector 61 into a conventional 115 volt, 60 cycle supply line socket and closure of the line switch 62, the pilot lamp 63 indicating the apparatus is energized. Three voltages are utilized, namely, 115 volts A.C. for energization of the cutter drive motor 11 and the timer motor 64, and unregulated 120 volts D.C. and regulated 150 volts D.C. obtained from the power supply 65, with separate ground return systems, as shown. The 150 volt D.C. line is connected directly to the input circuit of the potentiometer 35 (through the connector cable) and the 120 volt D.C. line is utilized to actuate the various switching circuits.

Closure of the line switch 62 energizes the power supply 65 and the motor 64 of the timer, which motor runs continuously throughout the test but does not, of itself, effect the circuit operation. On the other hand, the cutter drive motor 11 is connected across the 115 volt A.C. line through the normally-open contacts 66 of a stepping relay 70, the circuit being traced by the leads 71, 72, open switch contacts 66, leads 73, motor 11, and leads 74 and 75 back to the other side of the line. Thus, the cutter drive motor will run whenever the stepping relay contacts 66 are closed. The stepping relay is of conventional construction and includes an operating coil 76, a rotatable contact arm 77 and a ratchet mechanism whereby the contact arm advances into successive engagement with the stationary contacts in response to voltage pulses applied to the operating coil. In the drawing, the contact arm 77 is shown in the starting, or home position, in which position the contacts 66 are open. When the operating coil is energized, the contact arm advances to the next step and this step-by-step action continues, as additional energizing pulses are applied to the operating coil, until the arm 77 reaches the last, or reset contact, which electrically trips the ratchet mechanism whereby a spring returns the contact arm back to the home position. The contact arm carries an insulator pin such that the contacts 66 are closed for all positions of the contact arm, except the home position.

The test is started by the operator momentarily closing the starting switch 25, carried by the handle of the operating head (see also FIGURE 1), which completes the electrical circuit between the 120 volt supply and the operating coil of the stepping relay 70, the circuit being traced as follows: the 120 volt lead 78, the normally-closed reset switch 79, leads 80, 81, the upper, normally-closed contacts 82, of the relay 83, lead 84, the closed starting switch 25, leads 85, 86, and operating coil 76, the return connection being through ground. This causes the contact arm 77 of the stepping relay to advance one position, thereby permitting closure of the contacts 66 and energizing the cutter drive motor 11. The cutter now rotates at a constant speed and penetrates into the meat (under the downward pressure exerted by the springs 27, 28, see FIGURE 1), and the movable arm of the potentiometer 35 moves downwardly a distance corresponding to the downward axial displacement of the cutter. However, during the first revolution of the cutter, the integrator circuit is not functioning. The cams 15 and 16 rotate in synchronism with the cutter. It will be noted that the switches 17 and 18, associated respectively with the cams 15 and 16, are in open position at the start of the test. Shortly after the motor 11 is energized, the switch 17 will close momentarily and then will remain open until just after the cam starts a second revolution. This switch controls the operation of the integrator circuit. On the other hand, the switch 18 remains open and is closed but momentarily by the cam 16 just prior to the return of this cam to the illustrated position. This switch causes the actuation of the stepping relay.

Just prior to the end of the first cutter revolution, the switch 18 closes momentarily and energizes the operating coil of the stepping relay, the circuit being traced as follows: the +120 volt lead 80, lead 88, contacts 18, leads 89, 85 and 86. This causes the stepping relay contact arm to advance to the next position, namely, number 2, thereby closing the circuit to the operating coil of the relay 83. It will be noted that the stepping relay arm 77 is connected directly to the +120 volt lead 80. Thus, the electrical circuit to the operating coil of the relay 83 is completed through the stepping switch contact number 2, leads 90, 91, and blocking diode 92. When the operating coil of the relay 83 is thus energized, the two movable contacts become disengaged from the associated back stationary contacts and engage the associated front stationary contacts. Such closure of the lower contacts electrically lock the relay in the closed position, it being noted that the movable contact is connected to the +120 volt lead 80, whereas the ungrounded side of the operating coil is connected to the associated front contact. Thus, this relay remains closed for the time being.

The relay 54, of the integrator circuit, has its operating coil connected in parallel with the operating coil of the relay 83, through the voltage-dropping resistor 94 and the lead 95. Therefore, these two relays are simultaneously energized the moment the stepping relay contact arm moves to the number 2 position. The double pole, normally-closed contacts of the relay 54 open the shunt circuits across the two capacitors 42 and 44 thereby conditioning the integrating circuit for operation. Inasmuch as the operating coils of the relays 54 and 83 are connected in parallel, both relays remain electrically locked in the closed position for the remainder of the test and are not effected by the further step-by-step advance of the stepping relay in response to momentary closures of the cam-operated switch 18 during each revolution of the cam 16 and, of course, the cutter blade. As the cutter blade penetrates into the meat, the output voltage of the potentiometer 35 increases and such voltage appears across the leads 57, 58 at the integrator circuit. However, it will be noted that circuits to the two capacitors are broken by the normally-open contacts of the relays 52 and 53.

A short time after the switch 18 has momentarily closed to effect the closure of the relays 54 and 83, through the stepping relay, the lobe on the cam 15 flexes the movable blade of the contacts 17, whereby these contacts remain closed for a short time duration. The momentary closure of the contacts 17 applies the 120 volt switching voltage to the operating coil of the relay 96, the circuit being traced as follows; +120 volt lead 80, lead 97 connected to the contact arm 77 of the stepping relay, leads 90, 91, 98, now closed contacts 17, lead 99, and the blocking diode 100. Once the relay 96 is energized to the closed position, it is electrically locked in, it being noted that the ungrounded side of the relay operating coil is connected to the lower front stationary contact and that the associated movable contact is connected to the +120 volt lead 80 through the normally-closed contacts 101 and the lead 102. The closure of the upper contacts of the relay 96 applies the 120 volt switching voltage simultaneously to the clutch 103 and to the operating coil of the relay 53. In the latter case, the circuit is traced as follows; +120 volt lead 80, lead 104, now-closed contacts of the relay 96, lead 105, normally-closed contacts of the still deenergized relay 106, lead 107, and the voltage-dropping resistor 108. The closure of the normally-open contacts of the relay 53 closes the circuit to the capacitor 44 whereby the capacitor becomes charged by the potentiometer output voltage through the resistor 109.

Figure 5:
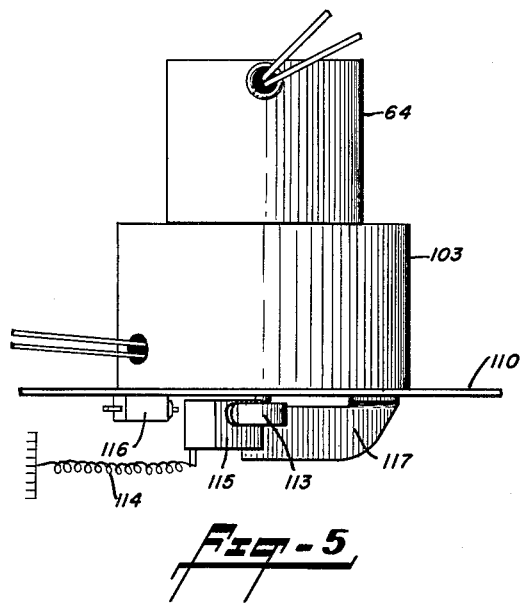
FIGURE 5 is a side view of the timing mechanism.
Figure 6:
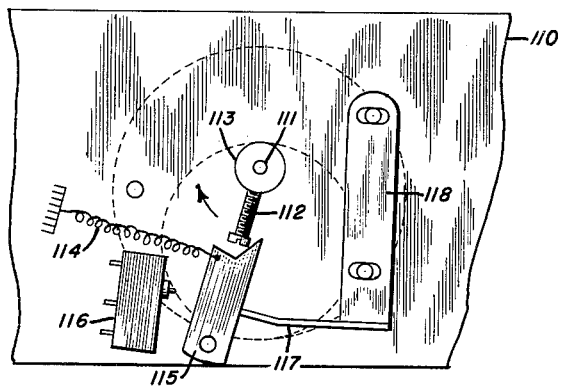
FIGURE 6 is a bottom view of the timing mechanism.

As stated hereinabove, the charging of the capacitor 44 is effected with respect to time. This is accomplished by means of a precise timing mechanism comprising the motor 64, clutch 103 and the associated contacts 101. The construction of the timing mechanism will now be described with specific reference to FIGURES 5 and 6, FIGURE 5 being a side elevational view and FIGURE 6 being a bottom view. The mechanism is mounted on a base 110 having an opening through which the output shaft 111 protrudes. Although the motor 64 runs continuously, the shaft 111 rotates only when the electric clutch 103 is energized, the rotational speed of the shaft being determined by the ratio of the gear train enclosed within the same housing as the clutch. In the present case, the shaft rotates at a precise speed of 1 revolution per four (4) seconds. A set screw 112 is threaded into a collar 113 that is firmly affixed to the shaft. Upon shaft rotation, clockwise, a relatively weak spring 114 biases the pivotal arm 115 into engagement with the operating pin of a single-pole, double-throw snap switch 116, the contacts of which are identified by the numeral 101 in FIGURE 7. At this point, the pressure exerted against the switch operating pin is not sufficient to effect a transfer of the switch contacts. However, as the set screw continues its rotation, it will strike the arm 115 and bring about a transfer of the switch contacts. When this happens, the electric clutch is immediately deenergized and an internal spring causes the output shaft 111 to return to its original position. During such return rotation of the shaft, the set screw engages the tapered end of the pivoted arm 115 causing it to strike a stop 117 carried by a bracket 118 that is adjustably secured to the base 110. The stop 117 is set so that the set screw rotates a full 360 degrees.

Referring, again, to FIGURE 7, it will be remembered that the motor 64, of the timing mechanism, runs continuously during the test. The stepping relay contact arm is still on stationary contact number 2, the relays 83 and 96 are locked in electrically, the contacts of the relay 55 are open and the contacts of the relay 53 are closed. Also, the cam 15, during the major portion of the second revolution of the cutter blade, permits the associated contacts 17 to remain open. The closure of the contacts of the relay 96, which effected a closure of the contacts of the relay 53, simultaneously results in an energization of the timing mechanism clutch 103, the circuit being traced as follows; the +120 volt lead 80, lead 104 and lead 120. Consequently, the moment that the charging circuit to the capacitor 44 has been closed (by the relay 53) the output shaft 111 of the timing mechanism begins to rotate. Such shaft rotation continues precisely for four seconds during which time the capacitor 44 is being charged by the potentiometer output voltage through the resistor, which voltage is proportional to the axial displacement of the cutter blade 19 from the fully retracted, or starting position. The voltage on the capacitor, $E_1$, is a function of the charging, or integrating time $t$ and the output voltage of the potentiometer $V_1$ obtained during the second revolution of the cutter blade. The final voltage on the capacitor can be determined from the equation;

$$E_1 = V_1(1 - e^{-t/RC}) \qquad (1)$$

where R and C are, respectively, the value of the resistor 109 in ohms and the capacitance of the capacitor in farads, and $V_1$ is the instantaneous value of the output voltage of the potentiometer.

The integrating period continues for the four-second period during which the shaft of the timing mechanism completes one revolution. At the end of such time period, the contacts 101 (of the single-pole, double-throw snap switch 116 shown in FIGURES 5 and 6) are transferred from the position shown in FIGURE 7 to a position wherein the movable contact engages the upper stationary contact. When this happens, the electrical lock-in circuit for the relay 96 is broken momentarily whereby the relay drops out to its normal position, it being noted that the +120 volts lead is connected to the holding circuit of the relay 96 only when the timer mechanism contacts 101 are in the illustrated position. The drop-out of the relay 96, in turn, results in a drop-out of the relay 53 thereby again opening the charging circuit of the capacitor 44. At the same time, the clutch 103 is deenergized since it receives power only when the relay 96 is in the energized, or closed position. Once the clutch is deenergized, the timing mechanism is automatically reset in preparation for the second integration period.

During the moment the timer switch movable contact was closed with the normally open, upper contact, the switching voltage also was applied to the operating coil of the relay 106 through the contacts of the still deenergized relay 120, the circuit being traced as follows; the +120 volt lead 80, lead 121, closed upper contacts of the relay 120, and the lead 122. The relay 106 locks in electrically, the holding circuit being obvious in the drawing, and the switching circuit is now set up for the next integration period.

The cutter blade 19 continues to rotate and the stepping relay continues to advance one step per blade revolution in response to the momentary closure of the contacts 18 by the cam 16. However, the integrator circuit does not function since the 120 volt switching voltage is applied to the integrator contacts 17 only when the contact arm of the stepping relay is in the number 2 or number 16 position. At the beginning of the sixteenth revolution of the cutter blade, the closure of the contacts 18 will cause the contact arm of the stepping relay to advance to stationary contact number 16, which contact is connected to contact number 2. The relay 83 has remained locked in from the time the stepping relay arm engaged stationary contact number 2. However, now the +120 volt lead is again connected (through stepping relay contact number 16) to the integrator contacts 17 which contacts again are closed momentarily, by the cam 15, a short time after the stepping relay has reached the sixteenth position. Such closure of the contacts 17 again energize the power relay 96 which, as already explained, locks in electrically. The closure of the contacts of the relay 96 again energizes the clutch 103, of the timing mechanism, thereby starting the precise timing interval for the second integration cycle. At the same time, the +120 volt switching voltage is applied across the operating coil of the relay 52, the circuit being traced as follows; the +120 volt lead 80, lead 104, closed contacts of the relay 106, the lead 125, voltage dropping resistor 126 and the lead 127, it being remembered that the relay 106 locked in electrically when the movable contact of the timer switch contacts closed with the upper stationary contact at the completion of the first integration cycle and thereby caused the relay 106 to lock in. Also, since the relay 106 is in the lock-in position, the +voltage appearing at the lead 105 energizes the operating coil of the relay 120, through the lead 130 and the blocking diode 131, which relay also locks-in electrically, as is obvious. The operation of the relay 120 to the closed, locked-in position transfers the "integrate complete" signal path from the relay 106 to the relay 132, as will be explained in more detail hereinbelow.

During the second integration period, the capacitor 42 is charged, through the common resistor 109 by the now increased output voltage of the potentiometer, the final voltage $E_2$ on the capacitor being;

$$E_2 = V_2(1 - e^{-t/RC}) \qquad (2)$$

where:

$V_2$ is the instantaneous value of the output voltage of the potentiometer, $t$ is the same precise time as in Equation 1, above, $R$ = the ohmic value of the resistor 109, and $C$ is the capacitance of the capacitor 42, which capacitance is matched to that of the capacitor 44 to better than 1 part in a thousand (0.1%).

The second integration cycle is completed at the end of the precise time interval when the timer switch contacts 101 move from the normally closed, illustrated position to the position where the movable contact engages the upper stationary contact. When this happens, the relay 96 drops out since it loses its holding voltage. This, in turn, results in a drop-out of the relay 52 thereby terminating the charging of the capacitor 42. When the timer switch movable contact is momentarily closed with the upper stationary contact, the operating coil of the relay 132 becomes energized, the circuit being traced as follows; the +120 volt lead 80, leads 102, 121 and 133 (relay 120 being in the closed position) and lead 134. The relay 132 thereupon locks in electrically. Also, the relay 56 is energized simultaneously with relay 132, it being noted that the power lead 134 to the operating coil of the relay 132 branches off as lead 135 to the voltage-dropping resistor 136 that is connected in series with the operating coil of the relay 56. The relay 56 has two sets of normally-closed contacts, one set closing the common charging circuit of the two capacitors 42, 44 and the other set short-circuiting the read-out device 45. Consequently, when the relay 56 is energized, as stated, the capacitor charging circuit is opened and the short circuit is removed from the read-out device. However, the individual output circuits of the capacitor are also normally open by reason of the two normally-open contact sets of the relay 55. The latter relay is actuated only when the contact 137, of the relay 132, engages with the associated normally-open stationary contact, the circuit being traceable through the leads 138, 139 and the voltage-dropping resistor 140. It is important to here point out that the contact 137 of the relay 132 is adjusted to provide as much time lag as possible between the operation of the relay 56 and the relay 55. Preferably, this time delay should be at least 10 milliseconds and is necessary to allow the contacts of relay 56 to open (thereby removing the short circuit from the read-out device and to open the charging circuits of the capacitors) before the closure of the contacts of the relay 55, which contacts cause the difference voltage of the series-opposition capacitors to be applied to the read-out device. Thus, the read-out device will respond (movement of its indicating pointer) to an extent determined by the difference in the voltages across the capacitors. Such difference voltage will remain displayed on the electronometer 45 for an extended period of time, permitting a reading of the pointer indication relative to a scale calibrated in factors of meat tenderness.

It will be remembered that the second integration cycle took place during the sixteenth revolution of the cutter blade. As the sixteenth cutter revolution is almost completed, the cam 16 will again cause a momentary closure of the associated contacts 18 thereby advancing the stepping relay to the 17th position, which, as is normal in relays of this type, is a built-in return position, that is, when the contact arm engages stationary contact 17, the ratchet mechanism is released and a spring causes the contact arm to return rapidly to the starting position, which, as illustrated in the drawing, results in an opening of contacts 66 thereby deenergizing the drive motor 11.

The purpose of the normally-closed reset switch 79 is to condition the circuit for another test. The momentary opening of the reset switch removes the switching voltage from all of the relays whereby they return to their normal positions. This connects the shunting resistors 142 and 143 across the respective capacitors 42 and 44 to drain off the charge thereon.

In summary, then, a test is started by the operator momentarily closing the starting switch 25 which moves the stepping relay off its home position thereby resulting in rotation of the motor 11. This motor, as well as the geared-down cutter blade and the cams 15 and 16 rotate continuously, at a constant speed, throughout the entire test. The periodic closure of the contacts 18, once per cycle of revolution of the cam 16, results in a step-by-step advance of the stepping relay. Similarly, the once per revolution closure of the contacts 17, by the cam 15, constitutes what may be termed a probing operation seeking to establish an integration cycle, but such probing action is ineffective except when the stepping relay is in the number 2 and number 16 position, corresponding respectively with the 2nd and 16th cutter revolution. Once the integration function has been set up, the actual start and completion of the integrating time period is established by the precise timing mechanism so that the time period of each integration cycle is identical. During the first integration cycle the capacitor 44 is charged by the output voltage of the potentiometer and during the second integration cycle the capacitor 42 is likewise charged. During the test, to this point, the discharge circuits of the two capacitors are open and the read-out device is short-circuited. After the completion of the second integration cycle, the short circuit is removed from the read-out device, and a short time thereafter, the capacitors are connected to the read-out device. Also, at the completion of the sixteenth cutter revolution, the stepping switch automatically returns to its starting position and the cutter blade stops rotating.

From the above description, it will be apparent that the apparatus provides a direct indication of the tenderness of the meat, or other product, tested in a relatively short time and with a high degree of repetitive accuracy. If the circuit time constant is large compared to the integration time, the voltage across the capacitor will be very nearly proportional to the product of the applied voltage and the length of time it is applied to the capacitor. In the described arrangement, the integration time period is maintained at a constant four seconds on all runs. This removes the requirement for operation in the linear portion of the exponential charge curve, as is required in the usual integrator, and permits operation with integration time periods perhaps 100 times larger than normal. Because of the fixed integration time period, the voltage on each capacitor at the end of the integration period will be proportional to the voltage applied from the potentiometer. This relationship, in this case, is linear even when the voltage across the capacitor increases non-linearly with time. Although the choice of the 4 second time period is not critical, it must be very reproducible on each of the integration cycles or accuracy will be sacrificed. This time period desirably approximates the period of the cutter and may be varied to adapt the apparatus for use with other products which may require a blade-cutting velocity substantially different from that for meat. Also, while it is preferable to use a circular cutter blade because of the simplicity of the driving mechanism, the switching and integration circuits can be used with a mono-planar cutting knife, in which case the knife and the cams 15 and 16 would be operated in synchronism by means of a suitable, reciprocating mechanism. Having the benefit of this disclosure, those skilled in this art will find no difficulty in making other changes and modifications to adapt the invention for specific applications. It is intended that such changes and modifications shall fall within the scope and spirit of the invention as recited in the following claims.

We claim:
1. A test apparatus comprising
   (a) a cutting member adapted to penetrate into a sample under test,
   (b) transducer means providing an electrical output voltage which varies in correspondence with the depth of penetration of the cutting member into the sample,
   (c) integrating means integrating the said output voltage over a predetermined time period during an ini- tial cycle of movement of said cutting member and during a second cycle of movement occurring during the same penetration as said first cycle,
(d) read-out means responsive to the difference of the specifically integrated values of said voltage.

2. The invention as recited in claim 1, wherein the said integrating means comprises a pair of matched capacitors, means applying a representative portion of the transducer output voltage across one capacitor during said initial selected cycle of movement of said cutting member and means applying a representative portion of the transducer output voltage across the other capacitor during said second selected cycle of movement of the cutting member.

3. The invention as recited in claim 1, wherein the said cutting member is a cylindrical blade rotated at a constant velocity, and the output voltage of the transducer is integrated during two, spaced rotation cycles of the blade.

4. The invention as recited in claim 3, wherein the said integrating means comprises a pair of matched capacitors, means applying a representative portion of the transducer output voltage to one capacitor during said initial selected revolution of the blade and means applying a representative portion of the transducer output voltage to the other capacitor in a reverse sense during the other selected revolution of the blade.

5. Meat testing apparatus comprising,
(a) a cutting blade positionable into contact with the surface of the meat,
(b) means applying a substantially constant blade-to-meat pressure,
(c) means actuating the blade in a plurality of meat-cutting cycles,
(d) transducer means coupled to the blade and providing an output voltage which varies in magnitude with blade penetration into the meat,
(e) read-out means responsive to the said output voltage, and
(f) integrating means for integrating said output voltage for predetermined constant time periods during two selected meat cutting cycles of the same blade penetration, and wherein the read-out means is responsive to the difference of the two integrated values of said voltage.

6. The invention as recited in claim 5, wherein the integrating means comprises a pair of matched capacitors, means applying the said output voltage across one capacitor during a first selected meat-cutting cycle of the blade and means applying the said output voltage across the other capacitor in a reverse sense during the second selected meat-cutting cycle of the blade.

7. Apparatus for testing meat, or the like, comprising,
(a) a cutting blade positionable into contact with the surface of the meat,
(b) drive means actuating the blade over a plurality of meat-cutting cycles during a penetration,
(c) means maintaining a substantially constant blade-to-meat pressure during the said cutting cycles,
(d) transducer means providing an output voltage which varies in magnitude with displacement of the transducer means,
(e) means coupling the transducer means to the blade such that the displacement of the transducer is proportional to the depth of penetration of the blade into the meat,
(f) voltage-integrating means,
(g) circuit elements impressing the said output voltage across the integrating means for a first predetermined time period during a first selected meat cutting cycle of the blade, thereby providing a first voltage signal,
(h) circuit elements impressing the said output voltage across the integrating means for a second equal predetermined time period not included in said first time period, during a second selected meat-cutting cycle of the blade thereby providing a second voltage signal,
(i) and read-out means responsive to the difference of the signal voltages.

8. The invention as recited in claim 7, wherein the read-out means includes a pointer cooperating with a scale calibrated in factors of meat tenderness.

9. The invention as recited in claim 7, wherein the integrating means comprises a pair of matched capacitors, and wherein a representative portion of the output voltage of the transducer means is impressed across one capacitor during the said first selected cycle and across the other capacitor during the said second selected cycle.

10. The invention as recited in claim 7, wherein the cutting blade is cylindrical and carried by a shaft that is rotatable by the drive means, and wherein the transducer means is a potentiometer having a constant voltage applied to its input terminals and a movable contact arm coupled to the said shaft.

11. Apparatus for testing meat, or the like, comprising,
(a) a motor having a drive shaft,
(b) a rotatable cutting blade positionable into contact with the meat surface, said blade having a central shaft coupled to said drive shaft for simultaneous rotation therewith,
(c) means affording relative axial displacement of the said shaft during blade rotation,
(d) means maintaining a substantially constant blade-to-meat pressure during blade rotation,
(e) means producing an output voltage which varies in magnitude with axial displacement of the blade,
(f) a pair of matched capacitors,
(g) a stepping relay having a rotatable contact arm movable into step-by-step engagement with stationary contacts in response to energization of the relay operating coil,
(h) means effecting energization of the stepping relay operating coil in correspondence with rotation of the blade,
(i) means applying a representative portion of said output voltage to one of said capacitors when the stepping relay contact arm engages a first selected stationary contact,
(j) means applying a representative portion of said output voltage to the other capacitor when the stepping relay contact arm engages a second selected stationary contact,
(k) read-out means calibrated in factors of meat tenderness,
(l) and circuit elements for impressing the difference voltage of the capacitors across the read-out means.

12. The invention as recited in claim 11, including a normally-closed switch connected in series with said motor and means actuated by the stepping relay contact arm for opening the said switch when the said contact arm is in the starting position.

13. The invention as recited in claim 11 including a timing mechanism adapted when energized to effect the alternate charging of each capacitor for a predetermined time period, and means energizing the timing mechanism only when the stepping relay contact arm is in engagement with the first selected stationary contact and then again when the contact arm is in engagement with the second selected stationary contact.

14. The invention as recited in claim 13, including switch means normally opening the circuit between the capacitors and the read-out means, and means actuating said switch means to close said circuit after the timing mechanism has opened the charging circuit after the second predetermined time period.

15. The invention as recited in claim 11 including means for discharging each capacitor prior to the start of a test.

References Cited by the Examiner

UNITED STATES PATENTS

| 2,330,753 | 9/43 | Sikes | 73—151.5 |
| 2,405,133 | 8/46 | Brown | 73—105 |
| 2,473,063 | 6/49 | Kerr | 73—101 |

FOREIGN PATENTS 738,606  10/55  Great Britain.

RICHARD C. QUEISSER, *Primary Examiner.*

JOSEPH P. STRIZAK, *Examiner.*